US008594440B2

(12) United States Patent
Obrador

(10) Patent No.: US 8,594,440 B2
(45) Date of Patent: Nov. 26, 2013

(54) AUTOMATIC CREATION OF A SCALABLE RELEVANCE ORDERED REPRESENTATION OF AN IMAGE COLLECTION

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

(21) Appl. No.: 12/989,061

(22) PCT Filed: Aug. 21, 2008

(86) PCT No.: PCT/US2008/073874
§ 371 (c)(1),
(2), (4) Date: Oct. 21, 2010

(87) PCT Pub. No.: WO2010/021625
PCT Pub. Date: Feb. 25, 2010

(65) Prior Publication Data
US 2011/0038550 A1    Feb. 17, 2011

(51) Int. Cl.
*G06K 9/62*    (2006.01)
*G06F 7/00*    (2006.01)

(52) U.S. Cl.
USPC ............................................. 382/225; 707/3

(58) Field of Classification Search
USPC ................. 382/225; 348/231.2; 707/E17.023
See application file for complete search history.

(56) References Cited

U.S. PATENT DOCUMENTS

| 2006/0104520 A1 | 5/2006 | Kraus et al. |
| 2006/0200475 A1* | 9/2006 | Das et al. ........................ 707/100 |
| 2006/0259863 A1* | 11/2006 | Obrador et al. ................ 715/723 |
| 2007/0030364 A1* | 2/2007 | Obrador et al. ................ 348/241 |
| 2008/0088642 A1* | 4/2008 | Obrador et al. ................ 345/619 |
| 2009/0024580 A1* | 1/2009 | Obrador ............................ 707/3 |

FOREIGN PATENT DOCUMENTS

| CN | 101167076 A | 4/2008 |
| JP | 20000250943 A | 9/2000 |
| JP | 2006-203574 A | 8/2006 |
| JP | 20060203574 A | 8/2006 |

OTHER PUBLICATIONS

Obrador, P., ("Content Selection based on Compositional Image Quality," in Proc. SPIE, vol. 6500, San Jose, CA, 2007).*
View of Obrador, P., ("Content Selection based on Compositional Image Quality," in Proc. SPIE, vol. 6500, San Jose, CA, 2007).*
Chen, X. et al., "Facial Expression Recognition: A Clustering-Based Approach", Pattern Recognition Letters, p. 1295-1302, Jun. 2003.
Hall, D. et al., "Temporal Event Analysis: Finding Events in Photo Collections", Research Disclosure, p. 302-305, Mar. 2007.
Moroney, N. et al., "Lexical Image Processing", submitted to the 16th IS&T/SID Color Imaging Conf. 2008.

(Continued)

*Primary Examiner* — Amara Abdi

(57) ABSTRACT

In a method of automatically creating a scalable relevance ordered representation of an image collection, the images in the image collection are classified into a plurality of clusters based upon a feature of the images. In addition, respective relevance levels of the images contained in each of the plurality of clusters are determined and the images in each of the plurality of clusters are ordered according to the relevance levels. Moreover, the images from the ordered plurality of clusters are arranged according to a predefined arrangement process to create the scalable relevance ordered representation of the image collection.

17 Claims, 5 Drawing Sheets

(56) References Cited

OTHER PUBLICATIONS

Obrador, P., "Content Selection Based on Composional Image Quality", HPL-2006-166, Nov. 9, 2006.

Obrador, P., "Multiresolution Color Patch Extraction", Proc. of SPIE, Electronic Imaging, VCIP 2006.

Xiao, J. et al., "Face Bubble: Photo Browing with Faces", Proc. of Advanced Visual Interfaces 2008, May 2008.

* cited by examiner

AUTOMATIC CREATION OF A SCALABLE RELEVANCE ORDERED REPRESENTATION OF AN IMAGE COLLECTION

RELATED APPLICATIONS

The present application shares some common subject matter with copending and commonly assigned U.S. patent application Ser. No. 11/127,079, titled "METHOD AND SYSTEM FOR AUTOMATICALLY SELECTING IMAGES FROM AMONG MULTIPLE IMAGES", filed on May 12, 2005, and copending U.S. Provisional Patent Application Ser. No. 61/012,099, titled "PROCESSING PIXEL VALUES OF A COLOR IMAGE", filed on Dec. 7, 2007, the disclosures of which are hereby incorporated by reference in their entireties.

BACKGROUND

With the advent and proliferation of digital cameras and video recorders, along with increased data storage capabilities at increasingly lower costs, it has become common for users to collect ever increasing numbers of images in a collection. For instance, it is not uncommon for users to take hundreds of digital images during a single event, such as, a wedding, a vacation, and a party. When a user wishes to create a photo album, photobook, or a slideshow containing some of the images, the user typically arranges the photographs in chronological order, based on scene content, or the person who captured the photographs. However, due to the relatively large number of images, users often spend a great deal of time in sorting through the image collection to determine which of the images to include.

Conventional systems for automatic image classification have been applied to multiple images stored in a database. The classification has been used to index images so that the images may be categorized, browsed, and retrieved. In addition, images have been stored in the database with descriptive information regarding the image file, such as, the file creation date, file name, and file extension. Techniques used for image classification are, for the most part, similar to classification techniques applied to any form of digital information.

An exemplary image classification technique provides for navigation through a collection of images to facilitate image retrieval. The appearance of an image is summarized by distribution of color or texture features, and a metric is defined between any two such distributions. A measure of perceptual dissimilarity is provided to assist in image retrieval. Two or three-dimensional Euclidean space has been used to evaluate differences in distances between images to highlight image dissimilarities. The results may be used to assist in a database query for locating a particular image.

Although conventional image classification techniques provide users with the ability to more easily navigate through images, these techniques still require that users expend a great deal of manual effort in selecting desired images, such as, images representative of particular events, because the users are still required to manually search through the images.

An improved approach to selecting good representative images from an image collection for inclusion in a photo album, photobook, a slideshow, etc., that requires relatively less user input would therefore be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Described herein are methods and systems for automatically creating a scalable representation of an image collection. The scalable representation is composed of an arrangement of images selected from an image collection that provides a desired result. For instance, the scalable representation is composed of the most relevant images in the image collection that provide good coverage of particular events. The most relevant images may comprise those images containing particular people, places, events, etc. In addition, the most relevant images may comprise the most appealing images. As another example, the scalable representation is composed of images arranged and ordered to tell a story based upon the order in which various events occurred. As a further example, the scalable representation if composed of images arranged and ordered to provide coverage of images containing particular people, objects, places, etc.

Through implementation of the methods and systems disclosed herein, a scalable ordered representation of an image collection may automatically be created, such that, the scalable representation may easily be scaled to incorporate a desired number of images into at least one of a document, a photobook, a photo album, a slide show, a calendar, etc., while providing at least a desired level of coverage. The representation is easily scalable because the images are ordered in terms of relevance and thus, the least relevant images may be easily removed to enable only the most relevant images to remain in the representation as desired.

Figure 1:
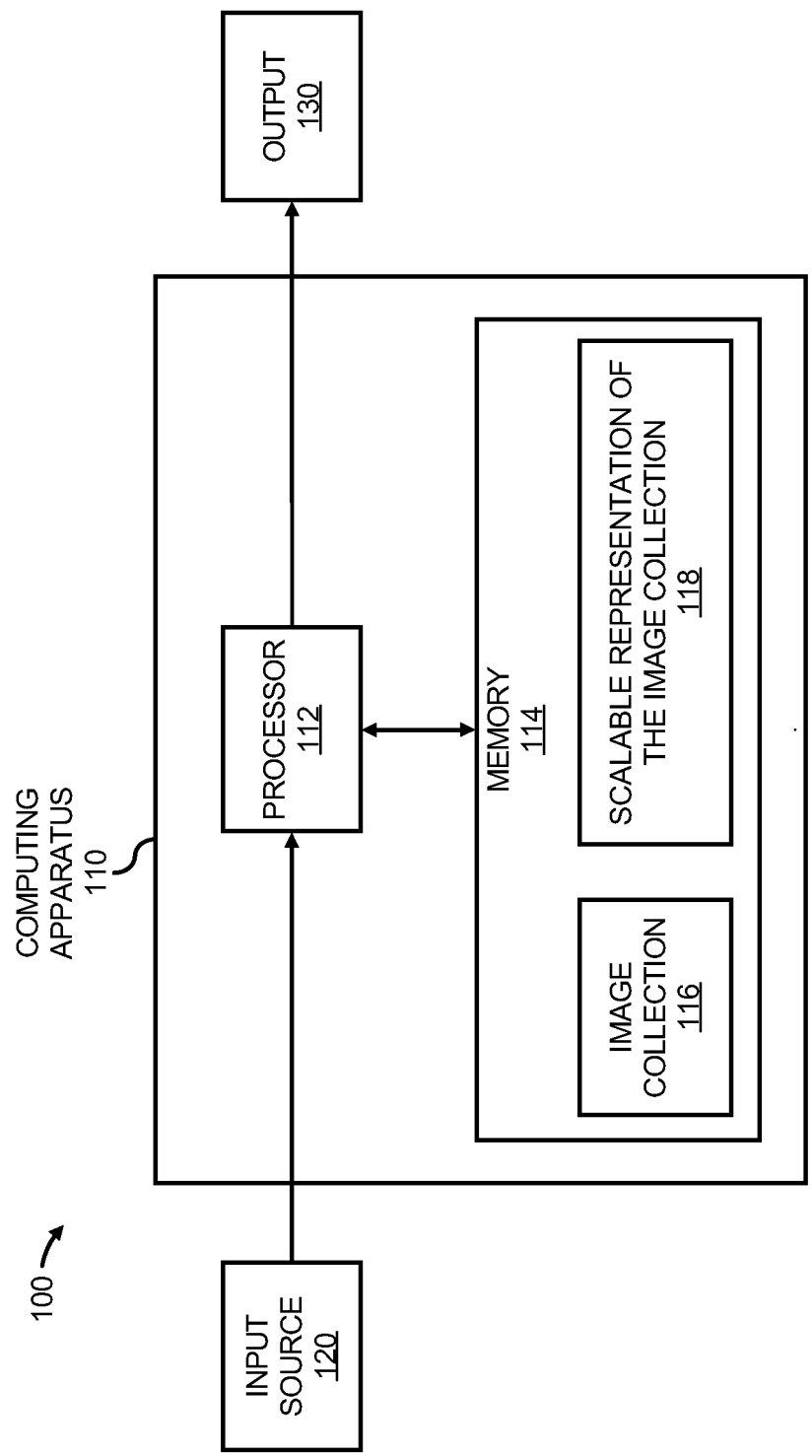
FIG. 1 depicts a simplified block diagram of a computer-implemented system for creating a scalable relevance ordered representation of an image collection, according to an embodiment of the invention.

With reference first to FIG. 1, there is shown a simplified block diagram of a computer-implemented system 100 for creating a scalable relevance ordered representation of an image collection, according to an example. In one regard, the various methods and systems disclosed herein may be implemented in the computer-implemented system 100 depicted in FIG. 1 as discussed in greater detail herein below. It should be understood that the system 100 may include additional components and that some of the components described herein may be removed and/or modified without departing from a scope of the system 100.

As shown in FIG. 1, the system 100 includes a computing apparatus 110, an input source 120, and an output 130. The computing apparatus 110 includes a processor 112 and a memory 114, which stores an image collection 116. The processor 112 is configured to control various operations performed in the computing apparatus 110. One of the operations includes the creation of a scalable relevance ordered representation 118 of the image collection 116, which may also be stored in the memory 114. Alternatively, however, the image collection 116 may be stored in a separate data storage device, such as, an external data storage device, etc. In any regard, the image collection 116 may comprise all of the image files contained in a single file folder, a subset of the all of the image files contained in the single file folder, the images contained in a plurality of file folders, etc.

As referenced herein, an "image" is any image or electronic data file that is stored in electronic form in any type of electronic storage medium or computer memory. An image can be any digital image captured from any type of digital capturing device, such as, without limitation, digital video cameras, digital still cameras, video capture cards, or other image capturing device. An image may alternately be an analog image captured from, for example, any camera, video camera, or analog image capture source or device, that are scanned or otherwise digitized and stored as a digital image. An image may also be an electronic document, such as, for example, a multimedia document that contains images, video, sound, etc. Those skilled in the art will recognized that the image can be any type of electronic file that a user may access from a collection of electronic data file.

Generally, speaking, the scalable relevance ordered representation 118 of the image collection 116 comprises an arrangement of the images in the image collection 116, such that, when the representation 118 is scaled to include fewer than all of the images, for instance, by removing images identified as being relatively less relevant, the remaining images provide a relatively good coverage of all of the important events (faces, animals, places, objects, etc.) in the image collection. Various manners in which the processor 112 may create the scalable relevance ordered representation 118 are described in greater detail herein below.

According to an example, the processor 112 comprises a microprocessor circuit programmed to create the scalable relevance ordered representation 118. According to another example, code for creating the scalable relevance ordered representation 118 is stored as software on the memory 114, which the processor 112 is configured to implement or execute.

In any regard, the memory 114 comprises any reasonably suitable device capable of storage of information or any combination of devices capable of storage of information, such as, a semiconductor device, a magnetic disk memory device, nonvolatile memory devices, such as, an EEPROM or CDROM, etc. The memory 114 may also comprise a fixed or removable data storage device. In addition to storing the image collection 116 and the scalable representation 118 of the image collection 116, the memory 114 may also store one or more program instructions or code, which the processor 112 may execute in performing various operations of the computing apparatus 110.

The scalable relevance ordered representation 118 may comprise copies of the images contained in the image collection 116. Alternatively, the representation 118 may comprise indications of the images contained in the image collection 116. In addition, the representation 118 need not be stored as part of the memory 114, but may be stored in a separate location, and may include any information which will allows the processor 112 to retrieve, for sequential display, the selected images. For example, the selected images (or indications thereof), or portions thereof, associated with the representation 118 may be stored within a local memory of the processor 112.

The input source 120 may comprise a user interface, such as, a keyboard, mouse, touchscreen display, another computing apparatus, etc., that a user may use in inputting data into the computing apparatus 110. For instance, a user may employ the input source 120 to input information pertaining to the number of images, the percentage of images from the image collection, the objects contained in the images, etc., desired in the representation 118 of the image collection 116. The user may also employ the input source 120 to tag selected ones of the images as being highly relevant, identify desired parameters in the representation 118.

The output 130 may comprise any reasonably suitable apparatus to which the scalable representation 118 of the image collection 116 may be outputted. The output 130 may thus comprise, for instance, a display, a printer, another computing apparatus, a data storage device, a server connected to the computing apparatus 110 via the Internet, etc. By way of example, the scalable representation 118 may be employed to substantially automatically create a photo-book, a slideshow, a calendar, a photo-album, etc., containing selected images from the image collection 116, which may be stored, displayed, and/or printed by the output 130.

Although not shown, the computing apparatus 110 may include additional components, such as, a communication bus and a secondary memory. The computing apparatus 110 may also be interfaced with user input and output devices, such as, a keyboard, a mouse, and a display. In addition, the processor 112 may communicate over a network, for instance, the Internet, LAN, etc., through a network adaptor.

Figure 2:
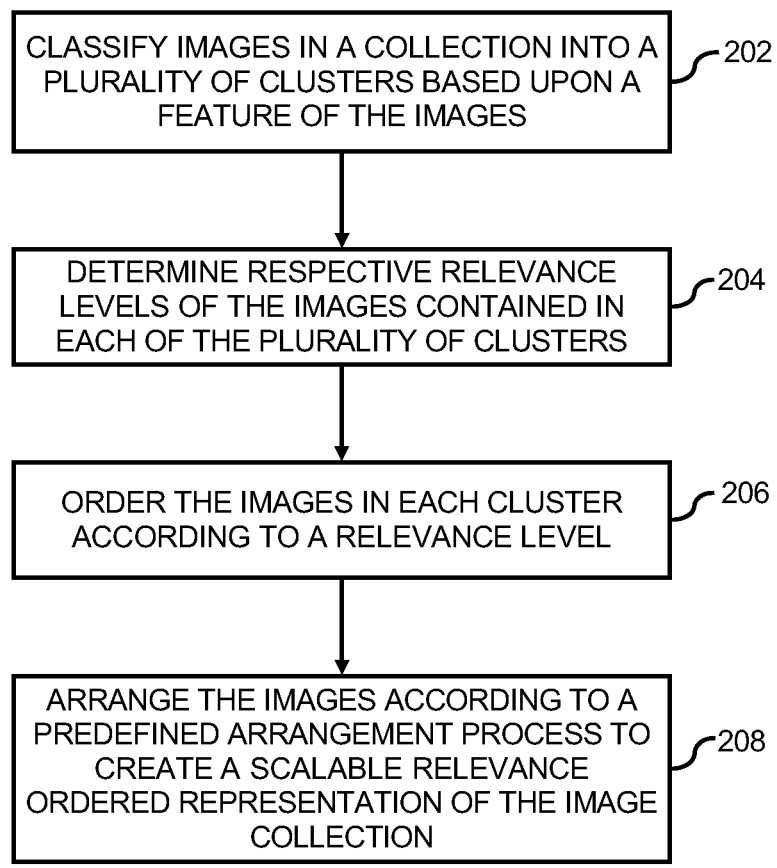
FIG. 2 depicts a flow diagram of a method of creating a scalable relevance ordered representation of an image collection, according to an embodiment of the invention.

An example of a method in which the computing apparatus 110 may be employed to create a scalable relevance ordered representation 118 of an image collection 116 will now be described with respect to the following flow diagram of the method 200 depicted in FIG. 2. It should be apparent to those of ordinary skill in the art that other steps may be added or existing steps may be removed, modified or rearranged without departing from the scope of the method 200.

The description of the method 200 is made with reference to the computing apparatus 110 illustrated in FIG. 1, and thus makes reference to the elements cited therein. It should, however, be understood that the method 200 is not limited to the elements set forth in the system 100. Instead, it should be understood that the method 200 may be practiced by a computing apparatus having a different configuration than that set forth in FIG. 1.

Some or all of the operations set forth in the method 200 may be contained as a utility, program, or subprogram, in any desired computer accessible medium. In addition, the method 200 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

The processor 112 may implement or execute the method 200 to create a scalable relevance ordered representation 118 of the image collection 116. As will become clearer from the discussion below, the representation 118 is considered to be scalable because the processor 112 is configured to order the images according to a relevance measure. As such, when the representation 118 is scaled down, there is less impact on the overall representation 118 because less relevant images are removed from the representation 118 first.

Figure 3A:
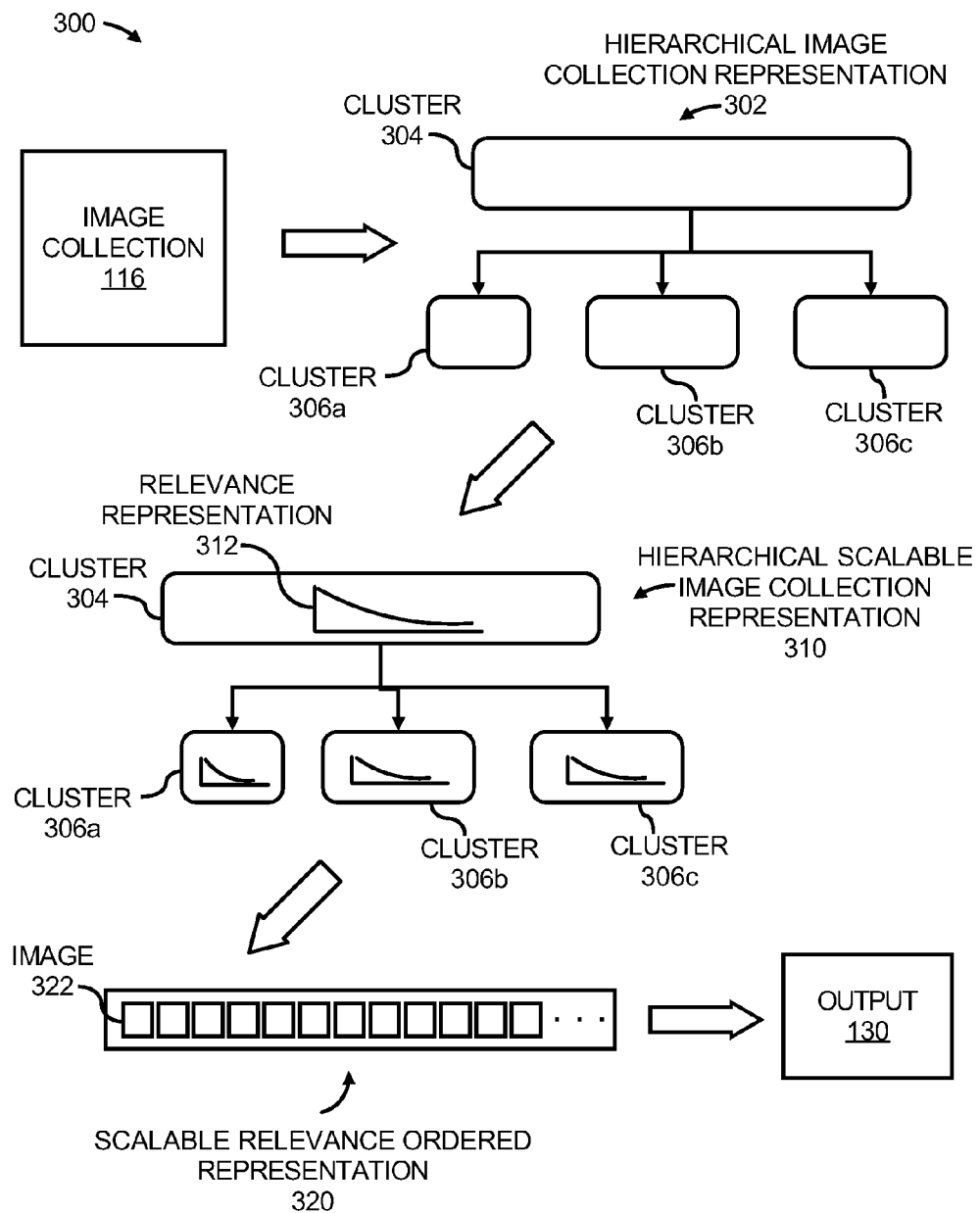
FIG. 3A depicts a graphical illustration of the steps contained in the flow diagram depicted in FIG. 2, according to an embodiment of the invention.
Figure 3B:
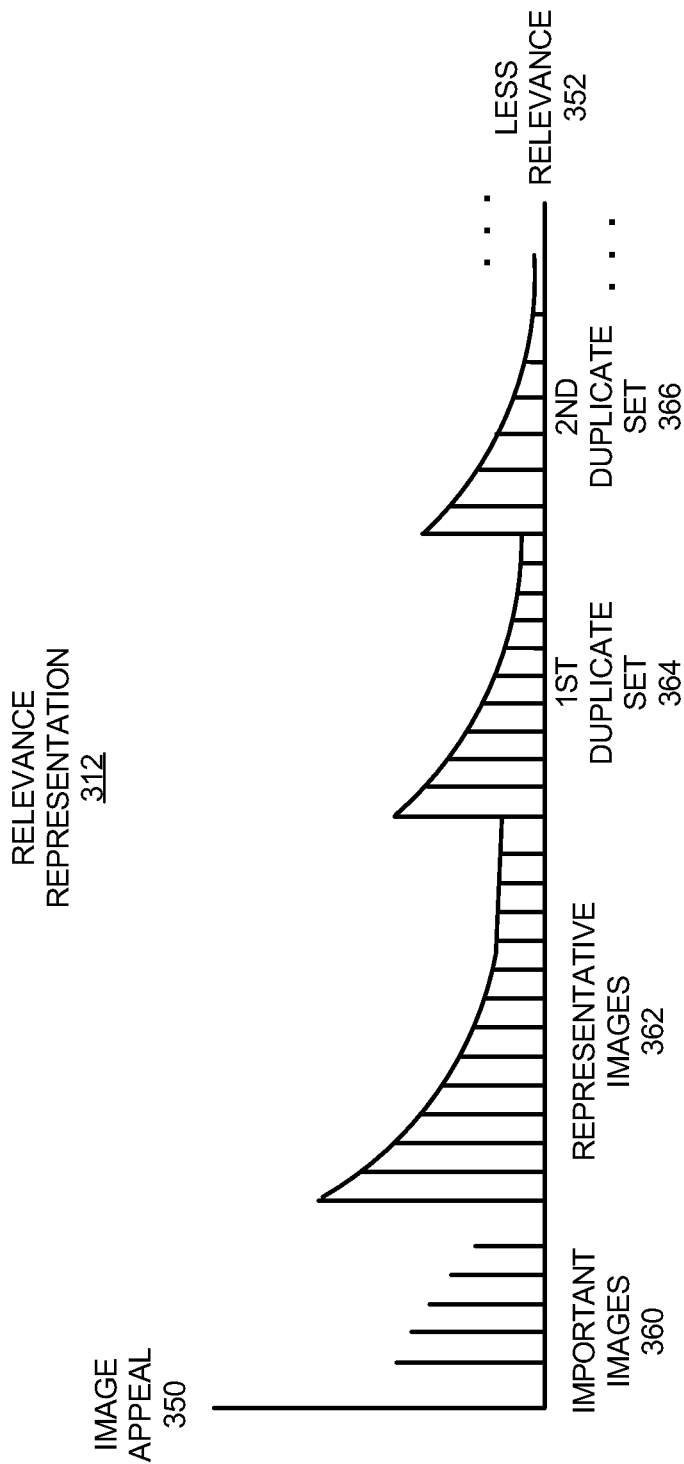
FIG. 3B shows a graphical relevance representation of a step contained in the flow diagram depicted in FIG. 2, according to an embodiment of the invention.

The method 200 will be described with reference to FIGS. 3A and 3B, which respectively depict a graphical illustration 300 of the steps contained in the method 200 and a graphical relevance representation 312 of step 206. Specific reference to the elements depicted in FIGS. 3A and 3B are made for purposes of illustration and not of limitation. As such, the method 200 should not be construed as being limited to the elements depicted in FIGS. 3A and 3B.

At step 202, the processor 112 classifies the images contained in the image collection 116 into a plurality of clusters based upon at least one feature of the images. In one example, each of the plurality of clusters comprises a different time period, for instance, based upon a temporal characteristic. In another example, each of the plurality of clusters comprises a different actor or object. In yet a further example, each of the plurality of clusters comprises a different geographic location, either as depicted in the image or based upon identification data, such as, a global positioning system coordinate associated with the different geographic locations. According to a further example, the processor 112 may classify the images into clusters of more than one type, such as, both time clusters and actor clusters. It should be understood that the clusters may be divided based upon any reasonably suitable characteristic(s) of either or both of the subject matter contained in the images and the identification data of the images.

In instances where the feature of the images comprises time, the processor 112 may obtain the time information from an automatically created time stamp associated with each image or from user-inputted time information. In instances where the feature of the images comprises actors, the processor 112 may execute or implement a face detection algorithm designed to identify faces in images and to also distinguish between the detected faces. An example of a suitable method for detecting and distinguishing between faces is described in Xiao, J. and Zhang, T., "Face Bubble: Photo Browsing with Faces", Proceedings of Advanced Visual Interfaces 2008, Napoli, Italy, May 28-30, 2008, the disclosure of which is hereby incorporated by reference in its entirety. Other types of objects in the images may be identified through similar methods.

As shown in FIG. 3A, the processor 112 may classify the images of the image collection 116 as a hierarchical image collection representation 302 having different hierarchies of clusters 304, 306a-306c. Each level of the hierarchy may include all of the same images, but divided into different numbers of clusters 304, 306a-306c. More particularly, for instance, the processor 112 may classify the images into a lesser number of clusters 304 at a higher level of the hierarchy and into a greater number of clusters 306a-306c at a lower level of the hierarchy.

According to an example, the processor 112 arranges the clusters hierarchically according to, for instance, time intervals in which the images contained in the clusters were obtained. In this example, the top hierarchy is devised to accommodate the smallest sized representations 118 in order to enable good coverage of images over a desired time period, as discussed herein below.

The clusters may be divided into any suitable time periods, such as, years, months, days, time periods within days, etc. For instance, with reference back to FIG. 3A, the higher level cluster 304 may be one month and the lower level clusters 306a-306c may be days or weeks in the month. A suitable example of a manner in which the clusters may be divided based upon temporal characteristics is discussed in the Ser. No. 11/127,079 application for patent.

At step 204, in each of the plurality of clusters, the processor 112 determines respective relevance measures of the images. The relevance measures of the images may comprise user-configurable relevance ordering based on one or more features such as, an image appeal metric, face clustering, smile detection, user-favorite tagging, and substantial similarities. The types of relevance measures applied and/or weighting applied to various ones of the relevance measures may be user-selectable. Thus, for instance, a user may indicate that images captured during a particular time frame or at a particular location are to be given greater relevance over other images. In addition, or alternatively, a user may indicate that images containing particular faces or objects are to be given greater relevance over other images.

Thus, by way of example, the processor 112 may process all of the images to determine one or more characteristics of the images and to determine respective relevance measures of the images. The one or more characteristics may include, for instance, whether the images contain faces, whether in those images containing faces, the actors are smiling, whether the images contain particular objects, etc. In cases where the processor 112 is configured to detect whether images contain smiling faces, the processor 112 may employ a facial expression recognition algorithm. An example of a suitable facial expression recognition algorithm is described in Chen, X., and Huang, T. "Facial Expression Recognition: a Clustering-Based Approach", Pattern Recognition Letters, v.24, n. 9-10, p. 1295-1302, Jun. 1, 2003, the disclosure of which is hereby incorporated by reference in its entirety. The processor 112 may also employ a suitable object detection algorithm to detect particular objects in the images.

The processor 112 may further implement an image appeal metric to determine image appeal values of each of the images contained in the image collection 116. In addition, the processor 112 is configured to use the image appeal values in determining respective relevance levels. For instance, the processor 112 is configured to assign higher relevance levels to images having higher image appeal values.

Generally speaking, "image appeal" may be defined as the interest that an image generates when viewed by human observers, incorporating subjective factors on top of the traditional objective quality measures. According to an example, the processor 112 automatically determines image appeal values for the images through implementation of an image appeal metric as described herein below.

In this example, for each of the images, the processor 112 assigns a representative sharpness (S) value to each region of the images. More particularly, the processor 112 is configured to use a conventional image matting algorithm where the matting result is intersected with the image regions. This allows the identification of the regions of the image with a certain texture/edge content on which sharpness may reliably be measured. The processor 112 employs a multi-resolution laplacian approach to determine the actual sharpness value. Under this approach, all 4 levels of the laplacian pyramid are combined in order to be resilient to image noise. In addition, the laplacian pyramid is weighted by a non-linear function to correct the measured blur for different contrast levels, since the blur perception changes with local contrast. The correction factor based on contrast has been implemented as:

$$SharpnessCorrectionFactor = \begin{cases} -0.0042 \cdot contrast + 1, & \text{for } 0 \le contrast \le 50 \\ 0.8 \cdot e^{-0.024(contrast-50)}, & \text{for } 51 \le contrast \le 200. \end{cases}$$

Equation (1)

The contrast (CN) is measured in each region using the root-mean square contrast. The root-mean square contrast is:

$$CN_i = \left[ \frac{1}{n_i - 1} \sum_{\forall j \in region_i} (x_j - \bar{x})^2 \right]^{1/2}, \text{ with}$$

Equation (2)

$$\bar{x} = \frac{1}{n_i} \sum_{\forall j \in region_i} x_j.$$

Equation (3)

The colorfulness (CF) is measured with an approach which combines both the color variance as well as the chroma magnitude in the CIE-Lab color space:

$$CF_i = \sigma_{a_i b_i} + 0.37 \mu_{a_i b_i}.$$

Equation (4)

In Equation (4), $\sigma_{ab}$ is the trigonometric length of the standard deviation in CIE-Lab space, and $\mu_{ab}$ is the distance of the center of gravity in CIE-Lab space to the neutral color axis.

For each of the images, the processor 112 combines the sharpness, contrast, and colorfulness maps to render an appeal map (AMap) for each of the images. In areas where there is texture/edge content, the processor 112 is configured to complement the sharpness metric in an additive manner with a contribution from both the contrast and the colorfulness. In areas that are mostly soft, for instance, contain no high frequencies, the contribution of contrast and colorfulness is much larger, that is, this will increase the image appeal measure of highly salient regions or highly colorful regions with little texture/edge content. The processor 112 thus renders the appeal maps (AMap) at each pixel (i,j) location as:

$$AMap_{i,j} = S_{i,j} + \alpha(S_{i,j}) \cdot CN_{i,j} + \beta(S_{i,j}) \cdot CF_{i,j},$$

Equation (5)

which is:

$$\alpha(S_{i,j}) = \begin{cases} \frac{1}{A + B \cdot SD_{region \supset (i,j)}}, & \text{for } SD_{region \supset (i,j)} < SDThres \\ \frac{1}{E}, & \text{for } SD_{region \supset (i,j)} < SDThres \end{cases}$$

Equation (6)

and $$\beta(S_{i,j}) = \begin{cases} \frac{1}{C + D \cdot SD_{region \supset (i,j)}}, & \text{for } SD_{region \supset (i,j)} < SDThres \\ \frac{1}{F}, & \text{for } SD_{region \supset (i,j)} < SDThres. \end{cases}$$

Equation (7)

In the equations above, SD is the "sharpness density" of the specific region to which each pixel (i,j) belongs, as the percentage of the region being covered by the output of the matting described above. By way of example, where SDThres=0.33, A=2, B=57, C=2, D=21, E=21, and F=9. These values substantially guarantee a higher contribution of both contrast and colorfulness in regions of low or no sharpness.

The processor 112 is also configured to calculate an image dependent threshold for the final appeal metric because different images may have very different appeal distributions. The image dependent threshold is set to one half the maximum value in the appeal map discussed above because in all images, there is bound to be a more relevant area than the others. As such, the final appeal metric will be measured within this region accordingly. More particularly, the processor 112 generates a binary map in which all of the regions with the appeal map value above the image dependent threshold is set to, for instance, "appealing" and all of the regions with the fuel map value below the image dependent threshold is set to, for instance, "not appealing".

The processor 112 may also consider an exposure measure in determining the final appeal metric for each of the images. Generally speaking, the processor 112 may impose penalties if no histogram clipping exists both at the high and low end, and there is good coverage of most luminance values. According to an example, the processor 112 may employ a model based on the average of the luminance histogram and its standard deviation as follows:

$$lumFactor = \begin{cases} \text{if } (averageLum < LLThres), & A_{lum} + (1 - A_{lum}) \cdot \frac{averageLum}{LLThres} \\ \text{if } (averageLum > LHThres), & 1 - B_{lum} \cdot \frac{averageLum - LHThres}{255 - LHThres} \\ \text{else,} & 1. \end{cases}$$

Equation (8)

And $$sigmaFactor = \begin{cases} \text{if } (sigmaLum < sLLThres), & A_{s-lum} + (1 - A_{s-lum}) \cdot \frac{sigmaLum}{sLLThres} \\ \text{if } (sigmaLum > sLHThres), & 1 - B_{s-lum} \cdot \frac{sigmaLum - sLHThres}{255 - sLHThres} \\ \text{else,} & 1. \end{cases}$$

Equation (9)

In the equations above, $B_{lum}=B_{s\text{-}lum}=0.2$, and $A_{lum}=A_{s\text{-}lum}=0.8$.

According to an example, LLThres=70, LHThres=160, sLLThres=35, and sLHThres=60.

The processor 112 may also determine the final exposure factor (E) to comprise the product of both the luminance factor and the standard deviation factor:

$$E = \text{lumFactor} * \text{sigmaFactor}. \quad \text{Equation (10)}$$

The processor 112 may further consider a homogeneity measure of the appealing region in each of the images. The homogeneity measure is considered by thresholding the appeal map twice, once with the image dependent threshold discussed above (½ of the maximum appeal value), and once with one half of the first threshold (¼ of the maximum appeal value), generating two appealing regions. With a lower threshold, the appealing region will expand to other regions of some intermediate appeal value. The more similar those two binary maps are (position and size) the higher the homogeneity measure. That is, if the distractions introduced with the lower threshold are many, that is an indication that the appealing region is not as easy to segment out from the background, and is therefore less homogeneous.

The processor 112 may still further measure the sizes (SZ) of the appealing regions in each of the images and may consider the sizes in determining the image appeal values of the images. For instance, the processor 112 may assign a greater value to those appealing regions in images having sizes greater than a threshold. By way of example, the threshold may be set around ⅓ of the image area. In one regard, the processor 112 may assign greater value to those images containing larger homogeneous appealing regions.

The processor 112 is configured to implement an image appeal metric that considers a combination of two or more of the above-described measures in determining an image appeal level for each of the images. An image appeal metric that results in favorable image appeal determinations is one that results in the product of the average of the appeal map over all of the appealing region times the other factors. That is, the most appealing images are those images that have good values for all of the above-described measures. By way of particular example, the processor 112 may be configured or programmed to determine the appeal measure (AM) of each image (i) by determining the average the image appeal map (AMap) over the image appeal region only, using any combination of sharpness (S), contrast (CN), and/or colorfulness (CF/OCF), to multiply the appeal average by the product of any combination of the other features: exposure (E), appealing region size (SZ), appealing region homogeneity (H), and colorfulness on the whole image, where N is the size of the appealing region in pixels, as noted in the following equation:

$$AMi = \left[\frac{1}{N} \sum_{\substack{i,j \\ \text{in appealing region}}}^{N} AMap_{i,j}\right] \cdot E \cdot OCF \cdot H \cdot SZ. \quad \text{Equation (11)}$$

The processor 112 may thus determine the image appeal values of the images in determining the respective relevance levels at step 204.

At step 204, the processor 112 further determines respective relevance levels by comparing the images within each of the clusters 304, 306a-306c to determine whether there are any images that are substantially similar to each other. The processor 112 identifies the substantially similar images to also determine relevance measures of the images as discussed below.

In determining whether images in the clusters 304, 306a-306c are similar to other images in the respective clusters 304, 306a-306c, the processor 112 may employ a similarity metric that is based on a region based lexical color quantization descriptor, described, for instance, in the 61/012,099 Provisional Patent Application. As described in that application, a lexical color quantization process is implemented on the images to convert the pixel values in the images to a second representation, where the second representation has a yellow-blue axis, a red-green axis, and a luminance axis.

According to an example, the processor 112 compares the converted pixel values of the images with each other. More particularly, the processor 112 may determine that images have a high similarity metric if the same lexical color regions in different images are similar in size and position. It should be understood, however, that the processor 112 may employ other methods of determining whether images are similar without departing from a scope of the method 200.

In addition, the processor 112 may apply a similarity threshold to distinguish between when two images are sufficiently similar to warrant labeling as being substantially similar to each other. The similarity threshold may differ for each of the levels of the cluster hierarchy. For instance, the similarity threshold may be relaxed further closer to the top of the hierarchy to substantially ensure larger and larger similarity clusters closer to the top of the hierarchy.

At step 206, the processor 112 orders the images in each cluster 304, 306a-306c according to one or more relevance measures, as shown in the hierarchical scalable image collection representation 310 in FIG. 3A. As shown therein, the images contained in each of the clusters 304, 306a-306c may be ranked according to a relevance representation 312. An example of a relevance representation 312 is depicted in greater detail in FIG. 3B.

FIG. 3B, more particularly, depicts a manner in which the processor 112 classifies the images in each of the clusters 304, 306a-306c based upon relevance, with one of the criteria for relevance comprising image appeal. As shown in FIG. 3B, the relevance representation 312 includes a vertically extending line labeled "image appeal 350" and a horizontally extending line labeled "lower relevance 352". In addition, each of the vertically extending lines represents a particular image, with the heights of the vertically extending lines representing the image appeal value for that image. It should be understood that the relevance representation 312 merely depicts one type of measure (image appeal) and that other measures, such as, image content, image capture times, focal lengths at which the images were captured, etc., may also be used to distinguish the images from each other. In this regard, the vertically extending line 350 may comprise another type of measure without departing from a scope of the relevance representation 312.

In any regard, those images positioned closer to the left side of the relevance 352 line have the highest relevance and those images positioned closer to the right edge of the relevance 352 line have the lowest relevance. The relevance 352 line is also depicted as being formed of a plurality of categories, where each of the categories has a different relevance value. In addition, within each of the categories, images having the highest image appeal are positioned further left along the lower relevance 352 line as compared with images having the lowest image appeal. Thus, the images having the highest image appeal are considered to have the highest relevance in each of the categories.

The categories have been depicted as, important images 360, representative images 362, first duplicate set 364, second duplicate set 366, etc. In addition, within each of the categories, the images have been arranged according to their respective image appeals, with those images having higher image appeals being positioned further left along the relevance 352 line.

As shown in FIG. 3B, the images identified as being important images 360 are given the highest relevance. These images may comprise, for instance, images that the user has directly or indirectly tagged as being highly desirable (the most relevant images). The user may directly tag the images by indicating their high relevance through the input source 120. In addition, or alternatively, the images may indirectly be tagged as being important based upon tracking of the user's use of the images. By way of example, a determination of whether the user has used the images in other applications, for instance, emails, documents, postcards, calendars, etc., may be made and the use may be tracked. Those images that have the greatest use may automatically be tagged as being important images. As a further example, the desirability (or relevance) of the images may be based upon feedback (such as tagging of the images) from a number of users, for instance, through a social networking application or other application that enables multiple users to access the collection of images.

The important images may also include other images that may have greater relevance over other images. For instance, images containing particular smiling actors may be classified as being important images.

The representative images 362 may comprise those images that either do not have duplicates (or substantially similar images) as described above. The representative images 362 may also comprise images having the highest image appeal out of duplicate images. Likewise, the images in the first duplicate set 364 may comprise those images that have been identified as being duplicates (or substantially similar images), but having the second highest image appeal of the duplicate images. Moreover, the images in the second duplicate set 366 may comprise those images that have been identified as being duplicates (or substantially similar images), but having the third highest image appeal of the duplicate images. Additional duplicate images may be classified into further duplicate sets according to their respective image appeal levels, until all of the images in each of the clusters 304, 306a-306c have been assigned.

At step 208, the processor 112 arranges the images contained in the clusters 304, 306a-306c of one hierarchical level according to a predefined arrangement process to create a scalable relevance ordered representation 118 of the image collection 116. The selection of the hierarchical level from which the images are to be arranged may be user-selected. For instance, a user may select a particular hierarchical level based upon the level of detail desired from the scalable representation 118. By way of example, the user may select a lower level of the hierarchy (containing more clusters) if the user desires a greater coverage of different events, time periods, actors, etc. Alternatively, the user may select a higher level of the hierarchy (containing less clusters) if the user desires selection of a broader range of images.

With reference to FIG. 3A, step 208 corresponds to the creation of the scalable relevance ordered representation 320 of the images 322. The order in which the images 322 are selected from the clusters 304, 306a-306c depends upon both the predefined arrangement process and the selected level of the hierarchy from which the images are selected because the images may be classified into different clusters and thus different categories (FIG. 3B) in the different levels of the hierarchy. For instance, an image classified as being a representative image 362 in one cluster level may be classified as being a duplicate image 364 in another cluster level.

According to a first example, the predefined arrangement process may comprise a user-configurable arrangement process. In this example, the user may select both the level of the hierarchy from which the images are selected. In addition, the user may select one or more of the clusters to have greater prominence. The user may further remove the images in one or more of the clusters altogether.

According to a second example, the arrangement of the images 322 in the scalable relevance ordered representation 320 is based upon a time hierarchy level selection. Under this example, the first decision is to select the right level in a time clustering hierarchy on which to operate, for instance, as an instruction from a user. Once the hierarchy level has been selected, the image selection process occurs at that level and the overall number of images (NN) to be selected drives the selection process. By way of example, the selection of the images (NN) may be based according to the following equations:

If $NN<NC_1$, then $NC_{select}=NC_1$, and  Equation (12)

If $NC_{i-1}>NN>NC_i$, then $NC_{select}=NC_i$.  Equation (13)

In the equations above, $NC_i$ is the number of time clusters at each hierarchy level i, with i being greater or equal to one. In addition, the equations above illustrate a manner in which the best time hierarchy for the best coverage of an image collection 116 may be selected.

In instances where the user gives more prominence to a certain time cluster at the selected level, the selection for this time cluster is performed at the immediate lower hierarchy level to enable better coverage of that specific event.

According to a third example, the arrangement of the images 322 in the scalable relevance ordered representation 320 is based upon a cluster size based approach. Under this approach, once the cluster hierarchy level has been selected, images are selected from each of the clusters at that level. In addition, the selection of images alternates among different clusters based upon specific rules. For instance, this approach favors the clusters with more representative images in a proportional manner.

Figure 4:
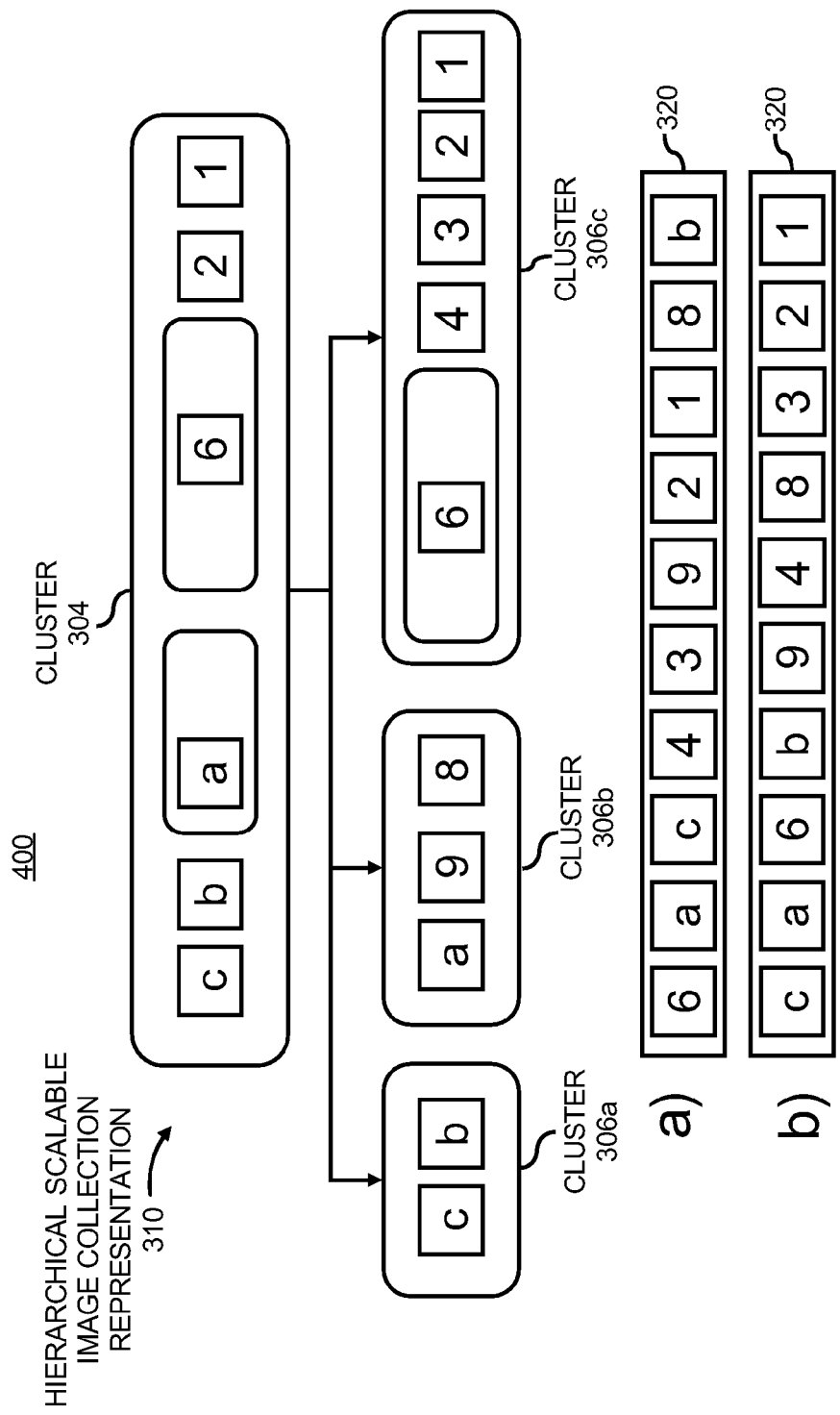
FIG. 4 shows a diagram of a sample hierarchical scalable image collection representation 310 and scalable relevance ordered representations, according to an embodiment of the invention.

Referring to FIG. 4, there is shown a diagram 400 of a sample hierarchical scalable image collection representation 310 and scalable relevance ordered representations 320, according to an example. Shown in the diagram 400 are two examples of scalable relevance ordered representations 320 that have been arranged using different selection approaches on the images contained in the clusters 306a-306c. The first representation 320(*a*) depicts an arrangement based upon the cluster size based selection approach discussed above. As shown therein, under this approach, the image having the highest relevance in the largest cluster 306c, which is the image labeled "6", is selected first, the highest relevance image in the next largest cluster 306b, which is the image labeled "a", is selected next, and then the image labeled "c" is selected next, and so forth. This approach results in a scalable relevance ordered list of images that provides good coverage of events with dissimilar images, which may be a preferred manner of storytelling with the images.

The second representation 320(*b*) depicts an arrangement based upon an average image relevance based selection approach. Under this approach, the images having the highest average relevance in each of the clusters are selected first, regardless of cluster size. More particularly, as shown in FIG. 4, the image labeled "c" is selected first, the image labeled "a"

is selected second, the image labeled "6" is selected third, etc. This approach favors the clusters whose average relevance of its representative images is relatively higher. In addition, this approach results in a scalable relevance ordered list of the image collection 116 with better coverage of highly relevant images, such as, images of particular people, particular landscapes, etc.

Generally speaking, the representation 320 is easily scalable because the less desirable images may easily be removed by removing the images from the right side of the representation 320. In other words, when a selected number of images is desired, the most relevant images, for instance, as identified by a user, may be kept by simply removing images identified as being less relevant. In this regard, the scalable relevance ordered representation 320 is similar to a scalable bitstream (such as, in image compression under JPEG2000).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of automatically creating a scalable relevance ordered representation of an image collection, said method comprising:
    classifying the images in the image collection into a plurality of clusters based upon a feature of the images;
    determining a respective relevance level of each of the images contained in each of the plurality of clusters, comprising:
        rendering a first appeal map of each image using a first image dependent threshold value of a metric to determine a first appealing region;
        rendering a second appeal map of each image using a second image dependent threshold value of the metric to determine a second appealing region;
        determining a respective appealing region homogeneity measure of each image based on a similarity of the first and second appealing regions; and
        determining the respective relevance level of each image based at least upon the respective appealing region homogeneity measure;
    ordering the images in each of the plurality of clusters according to the respective relevance levels; and
    arranging the images from the ordered plurality of clusters according to a predefined arrangement process to create the scalable relevance ordered representation of the image collection.

2. The method according to claim 1, wherein the feature comprises at least one of a time period, a content, a geographical position system based coordinate, and metadata of the images.

3. The method according to claim 1, further comprising:
    receiving input from a user identifying how the relevance levels of the images are to be determined, wherein the relevance levels are measured based upon the input received from the user.

4. The method according to claim 1, wherein determining respective relevance levels of the images contained in each of the plurality of clusters further comprises determining at least one of smiles, faces, and image appeal values of the images to determine the relevance levels.

5. The method according to claim 1, wherein the respective relevance level of images contained in each cluster of the plurality of clusters comprises a measure of a similarity level between two or more images in each cluster, said method further comprising:
    for each of the clusters, determining whether a plurality of the images are substantially similar to each other;
    in response to a determination that at least two of the images being substantially similar to each other, categorizing one of the substantially similar images as a representative image and categorizing another one of the substantially similar images as a duplicate image; and
    wherein ordering the images further comprises ordering the images such that the images categorized as representative images have greater relevance as compared with the images categorized as duplicate images.

6. The method according to claim 5, further comprising:
    determining an image appeal value for each of the images determined to be substantially similar to each other;
    ranking the images determined to be substantially similar to each other according to their respective image appeal values and wherein categorizing one of the substantially similar images as being a representative image further comprises categorizing the image having the highest image appeal value as the representative image; and
    wherein categorizing another one of the substantially similar images as a duplicate image further comprises categorizing the images having less than the highest image appeal values into one or more duplicate sets that are hierarchically arranged according to their image appeal values.

7. The method according to claim 6, further comprising:
    ranking images determined to be important as having the highest relevance levels.

8. The method according to claim 5, wherein determining whether any of the images in each of the clusters are substantially similar to each other further comprises determining whether any of the images in each of the clusters are substantially similar to each other through a lexical quantization process of each of the images.

9. The method according to claim 1, wherein determining respective relevance levels of the images further comprises determining image appeal values for each of the images based upon a combination of sharpness, contrast, colorfulness, and at least one of exposure, appealing region size, and the appealing region homogeneity measure of each of the images.

10. A computing apparatus for creating a scalable relevance ordered representation of an image collection, said apparatus comprising:
    a memory storing the image collection;
    a processor to:
        access the memory;
        classify the images in the image collection into a plurality of clusters based upon a feature of the images;
        determine a respective relevance level of each of the images contained in each of the plurality of clusters, wherein to determine the respective relevance level, the processor is to:
            render a first appeal map of each image using a first image dependent threshold value of a metric to determine a first appealing region;
            render a second appeal map of each image using a second image dependent threshold value of the metric to determine a second appealing region;
            determine a respective appealing region homogeneity measure of each image based on a similarity of the first and second appealing regions; and determine the respective relevance level of each image based at least upon the respective appealing region homogeneity measure;

order the images in each of the plurality of clusters according to the respective relevance levels; and arrange the images from the ordered plurality of clusters according to a predefined arrangement process to create the scalable relevance ordered representation of the image collection from the arranged images.

11. The computing apparatus according to claim 10, wherein the processor is further to determine at least one of smiles, faces, and image appeal values of the images to determine relevance levels of the images.

12. The computing apparatus according to claim 10, wherein the respective relevance level of images contained in each cluster of the plurality of clusters comprises a measure of a similarity level between two or more images in each cluster, wherein said processor is further to, for each of the clusters, determine whether a plurality of the images are substantially similar to each other, to categorize one of the substantially similar images as a representative image and to categorize another one of the substantially similar images as a duplicate image, and wherein the processor is further to order the images such that the images categorized as representative images have greater relevance as compared with the images categorized as duplicate images.

13. The computing apparatus according to claim 12, wherein the processor is further to determine an image appeal value for each of the images determined to be substantially similar to each other, to rank the images determined to be substantially similar to each other according to their respective image appeal values, to categorize the image having the highest image appeal value as the representative image, and to categorize the images having less than the highest image appeal values into one or more duplicate sets that are hierarchically arranged according to their image appeal values.

14. A non-transitory computer readable storage medium on which is embedded one or more computer programs, said one or more computer programs implementing a method of automatically creating a scalable relevance ordered representation of an image collection, said one or more computer programs comprising computer readable code to cause a computer to:

classify the images in the image collection into a plurality of clusters based upon a feature of the images;

determine a respective relevance level of each of the images contained in each of the plurality of clusters, wherein to determine the respective relevance level of each image, the computer is to:

render a first appeal map of each image using a first image dependent threshold value of a metric to determine a first appealing region;

render a second appeal map of each image using a second image dependent threshold value of the metric to determine a second appealing region;

determine a respective appealing region homogeneity measure of each image based on a similarity of the first and second appealing regions; and determine the respective relevance level of each image based at least upon the respective appealing region homogeneity measure;

order the images in each of the plurality of clusters according to the respective relevance levels; and arrange the images from the ordered plurality of clusters according to a predefined arrangement process to create the scalable relevance ordered representation of the image collection.

15. The non-transitory computer readable storage medium according to claim 14, said one or more computer programs further comprising computer readable code to cause the computer to:

determine at least one of smiles, faces, and image appeal values of the images to determine the relevance levels.

16. A method of automatically creating a relevance ordered representation of an image collection, said method comprising:

determining an image appeal map for each pixel of each image in the image collection based upon a combination of appeal metric values of at least two image appeal metrics;

determining an image appealing region of each image based upon an image dependent threshold value for the image appeal map;

determining an average appeal value corresponding to an average of the image appeal map over the image appealing region;

multiplying the determined average appeal value by a combination of values associated with other image appeal metrics for each image to obtain an image appeal value of each image;

determining respective relevance levels of each image based on the image appeal value of each image; and arranging the images of the image collection according to the determined respective relevance levels of the images to create the relevance ordered representation of the image collection.

17. The method according to claim 16, wherein determining an image appeal map for each pixel of each image comprises determining the image appeal map based upon any combination of a sharpness metric, a contrast metric, and a colorful metric, and wherein multiplying the determined average appeal value by a combination of values associated with other image appeal metrics includes multiplying the average appeal value by a combination of an exposure metric, appealing region size, an appealing region homogeneity, and colorfulness on the entirety of each image.

* * * * *